United States Patent [19]

Shropshire et al.

[11] 4,052,539

[45] Oct. 4, 1977

[54] ELECTROCHEMICAL CELL WITH A GRAHITE INTERCALATION COMPOUND CATHODE

[75] Inventors: Joseph A. Shropshire; Gerald H. Newman, both of Westfield, N.J.

[73] Assignee: Exxon Research & Engineering Co., Linden, N.J.

[21] Appl. No.: 760,156

[22] Filed: Jan. 17, 1977

[51] Int. Cl.² ............................................. H01M 6/14
[52] U.S. Cl. .................................................. 429/194
[58] Field of Search ........ 429/194, 196, 197, 191–193, 429/218

[56] References Cited

U.S. PATENT DOCUMENTS 3,990,915  11/1976  Newman et al. .................... 429/194

Primary Examiner—C. F. Lefevour
Attorney, Agent, or Firm—Joseph J. Dvorak

[57] ABSTRACT

A battery is disclosed having a nonaqueous electrolyte, an alkali metal anode and a cathode comprising a compound of grahite formed by reacting graphite with $ClF_3$ and a Lewis acid fluoride of an element selected from B, Si, Ge, Sn, Pb, P, As, Sb, Bi, Ti, Zr, Hf, V, Nb and Ta.

9 Claims, No Drawings

ELECTROCHEMICAL CELL WITH A GRAHITE INTERCALATION COMPOUND CATHODE

BACKGROUND OF THE INVENTION

1. Field of the Invention

This invention relates to batteries. More particularly, this invention relates to batteries having a non-aqueous electrolyte, an alkali metal anode and a cathode comprising a compound of carbon with fluorine and a Lewis acid as a cathode-active material.

2. Description of the Prior Art

Batteries have been widely used for many years. Generally their use is limited because of their low energy output per unit weight. Recently, interest has grown in attempting to develop nonaqueous high energy batteries which are capable of being discharged or recharged over many cycles.

Among the battery systems currently receiving intensive investigation are those which have lithium as the anode and intercalation compounds of graphite and fluorine as the cathode-active material. See, for example, Hunder, H. F., et al, "J. Electchem. Soc." 120, 1161 (1973).

Another nonaqueous battery baving a lithium anode and a lamellar graphite cathode is disclosed in U.S. Pat. No. 3,844,837. Specifically, the cathodic depolarizer of that battery is a compound formed by reacting pyrolytic graphite with certain lithium salts by impressing an electric current between a lithium anode and a pyrolytic graphite cathode immersed in a solution of the salt in an organic solvent. There are some serious limitations, however, on the use of such cells. The electrointercalation of the graphite will not result in a fully intercalated product. As a result thereof, the cathode is, to a large extent, graphite itself. Moreover, the cathode is subject to rapid disintegration as a result of expansion and contraction of the graphite during charge/discharge cycles. Additionally, since the intercalated anion is inserted in the lamellar graphite spacings mainly near the surface of the graphite, the anion apparently readily diffuses to the anode thereby discharging the cell internally.

Another nonaqueous battery that should be mentioned is that disclosed in U.S. Pat. No. 3,990,915. The cathode of that battery is formed by reacting crystalline carbon with an interhalogen fluoride in the presence of hydrogen fluoride.

SUMMARY OF THE INVENTION

According to the present invention, there is provided a new class of highly energetic cathodic oxidants formed by reacting a Lewis acid fluoride of an element selected from B, Si, Ge, Sn, Pb, P, As, Sb, Bi, Ti, Zr, Hf, V, Nb and Ta, and notably boron trifluoride, arsenic pentafluoride and phosphorus pentafluoride, with graphite and chlorine trifluoride in the presence of hydrogen fluoride. Thus, in one aspect of the present invention there is provided a battery comprising an alkali metal anode; a cathode containing as the cathode-active material one or more of the above-mentioned cathodic oxidants; and a non-aqueous electrolyte.

A suitable electrolyte useful in the battery of this invention is one which will not chemically react with the anode or the cathode and which will permit the migration of ions between the anode and the cathode during charging and discharging of the battery. Organic solutions of alkali metal salts are particularly preferred as the electrolyte.

An especially preferred battery of the present invention has a lithium anode, a cathode containing as the cathode-active material a compound of carbon formed by reacting graphite with $ClF_3$ and a Lewis acid selected from the group consisting of $BF_3$, $AsF_5$ and $PF_5$ in the presence of HF. The electrolyte for this battery preferably is a saturated solution of a lithium salt having in the anion thereof the same element as in the Lewis acid fluoride.

DETAILED DESCRIPTION OF THE INVENTION

The practice of the present invention permits the fabrication of the battery in a charged state and the components of such a battery will now be described herein in greater detail.

THE ANODE

The anode contains an alkali metal as the anode-active material. Preferably, the anode-active material is selected from the group consisting of lithium, sodium and potassium. Lithium is especially useful as the anode-active material.

The anode may be fabricated entirely from the above-described metals or it may consist of an underlying structure (fabricated of materials such as copper, nickel, etc.) upon which the anode-active material is deposited.

THE CATHODE

The cathode contains, as the cathode-active material, a compound of carbon formed by reacting graphite and a Lewis acid fluoride of an element selected from B, Si, Ge, Sn, Pb, P, As, Sb, Bi, Ti, Zr, Hf, V, Nb and Ta with chlorine trifluoride and in the presence of HF. The preferred intercalated graphite compounds are those in which the Lewis acid fluoride is selected from $AsF_5$, $BF_3$ and $PF_5$.

The cathode need not consist solely of the cathode-active material. Indeed, it is preferred to fabricate a cathode structure by mixing the cathode-active material with a binder such as polytetrafluoroethylene and impressing the mixture on a support structure such as a nickel or copper screen.

The cathode-active materials are prepared according to the method disclosed in co-pending application Ser. No. 760,157 filed Jan. 17, 1977, which disclosure is incorporated herein by reference. Basically, the cathode-active material is formed by charging a suitable reaction vessel with graphite and a sufficiently large excess of HF to act as a reaction diluent. Thereafter the vessel is sealed, cooled to below $-80°$ C, evacuated, charged with the Lewis acid fluoride and $ClF_3$ in a 1:1 mole ratio and allowed to warm to room temperature. Repeated additions of Lewis acid fluoride and $ClF_3$ are made until there is no further up-take of the reactants and they persist in the vapor phase. Thereafter the blue solid material containing from about 30 to 55 weight % carbon is isolated by filtration, vacuum evaporation or the like.

Especially preferred as the cathode-active material is a compound of carbon formed by reacting graphite in the presence of HF with $ClF_3$ and a Lewis acid selected from the group consisting of $AsF_5$, $BF_3$ and $PF_5$.

THE ELECTROLYTE

The electrolyte useful for preparing the battery of the present invention is one which does not chemically react with the anode or with the cathode and which will permit the migration of ions between the anode and cathode during charging and discharging cycles.

A general rule is that the electrolyte for the battery of this invention will be a nonaqueous solution of an alkali metal salt in which the alkali metal of this salt will be the same as the alkali metal of the anode, and the anion of the salt will contain the same element as the Lewis acid of the cathode-active material and indeed will be a fluoride of that element.

Suitable nonaqueous solvents for the alkali metal salts include organic solvent and in particular organic ethers and mixtures of organic ethers such as tetrahydrofuran and dimethoxyethane and mixtures thereof. Additionally, useful organic solvents include propylene, carbonate, dimethylsulfide, dimethylsulfoxide, etc.

The aforementioned solutions of alkali metal salts should be highly concentrated; and, indeed, it is preferred that such solutions be saturated solutions.

The following examples shall serve to illustrate the charged battery of the present invention:

EXAMPLE 1

A battery was constructed from a round nickel container having a nickel lid and a nickel base. The lid and base each had the following dimensions: diameter = 1.5 inches; depth = 0.20 inches. A polypropylene gasket fitted over the periphery of the base electrically insulating the lid from the base. The lid served as the electrical connector for the anode, and the base served as the electrical connector for the cathode. An expanded nickel screen was inserted in the lid and in the base cavity. Lithium metal was pressed on the nickel screen and served as the anode. In this test, the cathode-active material was a compound of graphite formed by reacting graphite with excess $ClF_3$ and $AsF_5$ in liquid HF. Two grams of the cathode-active material were impressed on the nickel screen in the base of the container. A glass filter paper separated the anode from the cathode. The glass separator was impregnated with a 3 molar solution of $LiAsF_6$ in an equivolume mixture of tetrahydrofuran and dimethoxyethane. The total assembly was crimped to seal the battery. Next, the open circuit voltage was measured and the battery was discharged at a constant current of 1 mA.cm² to a 2 volt cut-off. The capacity of the primary discharge was equal to about 220 mA.hrs.

EXAMPLE 2

A cell was constructed using as the cathode-active material 0.5 gm of a compound of graphite formed by reacting graphite with excess $BF_3$ and $ClF_3$ in liquid HF. The cathode-active material was mixed with 0.2 gm of aluminum wire and was pressed on an aluminum screen having an area of 1 sq. in. The anode was a Li—Al alloy pressed on a 1 sq. in. nickel screen. A Li reference electrode was also provided. The electrodes were separated by glass filter paper. The assembly, which was held together in a polypropylene bag was immersed in a glass container containing 2 molar $LiBF_4$ solution in dimethyl sulfite. The cell was cycled (charged and discharged) five times. Discharging was conducted at current densities of from 0.5 mA/cm² to 1.0 mA/cm² to a 1.5 volt cut-off. The charge and discharge capacity for each cycle is given in Table I below:

Table I

| Cycle | Charge Capacity (mA hrs.) | Discharge Capacity (mA hrs.) |
|---|---|---|
| 1 | 70 | 65 |
| 2 | 115 | 118 |
| 3 | 100 | 80 |
| 4 | 40 | 40 |
| 5 | 40 | 40 |

From the foregoing, it can be seen that each cycle was about 100% efficient.

EXAMPLE 3

In this example, the cathode-active material employed was formed by reacting graphite with excess $PF_5$ and $ClF_3$ in liquid HF. The cell was constructed by mixing 1.07 gm of the cathode-active material with 0.1 gm of polytetrafluoroethylene powder and pressing the mixture into a round nickel can 1.5 inches in diameter and 0.2 inches deep. A sheet of lithium metal was used as the anode and a lithium wire screen was used as a reference electrode. The anode, cathode and reference electrode were immersed in a plastic container having therein a 3 molar solution of $LiPF_6$ in an equivolume mixture of tetrahydrofuran and dimethoxyethane. The cell was discharged at 5 mA/cm² to a 1.7 volt cut-off. The total capacity of the cell was about 210 mA.hrs.

What is claimed is:
1. A battery comprising:
   a. an alkali metal anode;
   b. a cathode containing as the cathode-active material a compound of graphite formed by reacting $ClF_3$ and a Lewis acid fluoride of an element selected from B, Si, Ge, Sn, Pb, P, As, Sb, Bi, Ti, Zr, Hf, V, Nb and Ta in the presence of liquid HF whereby said graphite compounds contain from about 30 wt. % to about 55 wt. % carbon;
   c. a nonaqueous electrolyte which does not chemically react with said anode or said cathode and which will permit the migration of ions from said anode-active material to said cathode-active material.
2. The battery of claim 1 wherein said alkali metal anode is selected from lithium, sodium and potassium.
3. The battery of claim 2 wherein said alkali metal is lithium.
4. The battery of claim 1 wherein the Lewis acid fluoride is selected from $BF_3$, $PF_5$ and $AsF_5$.
5. The battery of claim 1 wherein the electrolyte is a nonaqueous solution of an alkali metal salt, the alkali metal being the same as the alkali metal of the anode, and the anion of the salt being the fluoride of the same element of the Lewis acid fluoride in the cathode-active material.
6. The battery of claim 5 wherein the electrolyte is a nonaqueous solution of a salt selected from $LiBF_4$, $LiPF_6$ and $LiAsF_6$ in an organic solvent.
7. The battery of claim 6 wherein the organic solvent is selected from ethers and mixtures thereof.
8. The battery of claim 7 wherein the organic solvent is selected from propylene carbonate, tetrahydrofuran, dimethylsulfite, dimethoxyethane and mixtures thereof.
9. A battery comprising:
   a. a lithium anode;
   b. a cathode containing as the cathode-active material a compound of graphite formed by reacting excess Lewis acid fluoride and $ClF_3$ in the presence of liquid HF, said Lewis acid fluoride being selected from $BF_3$, $PF_5$ and $AsF_5$; and
   c. a nonaqueous electrolyte consisting essentially of a saturated solution of a lithium salt having a fluoroanion of the same element as the Lewis acid fluoride of the cathode-active material.

* * * * *